No. 879,300. PATENTED FEB. 18, 1908.
A. T. NEWMAN.
TELEGRAPH SWITCHBOARD.
APPLICATION FILED MAR. 6, 1907.
3 SHEETS—SHEET 1.
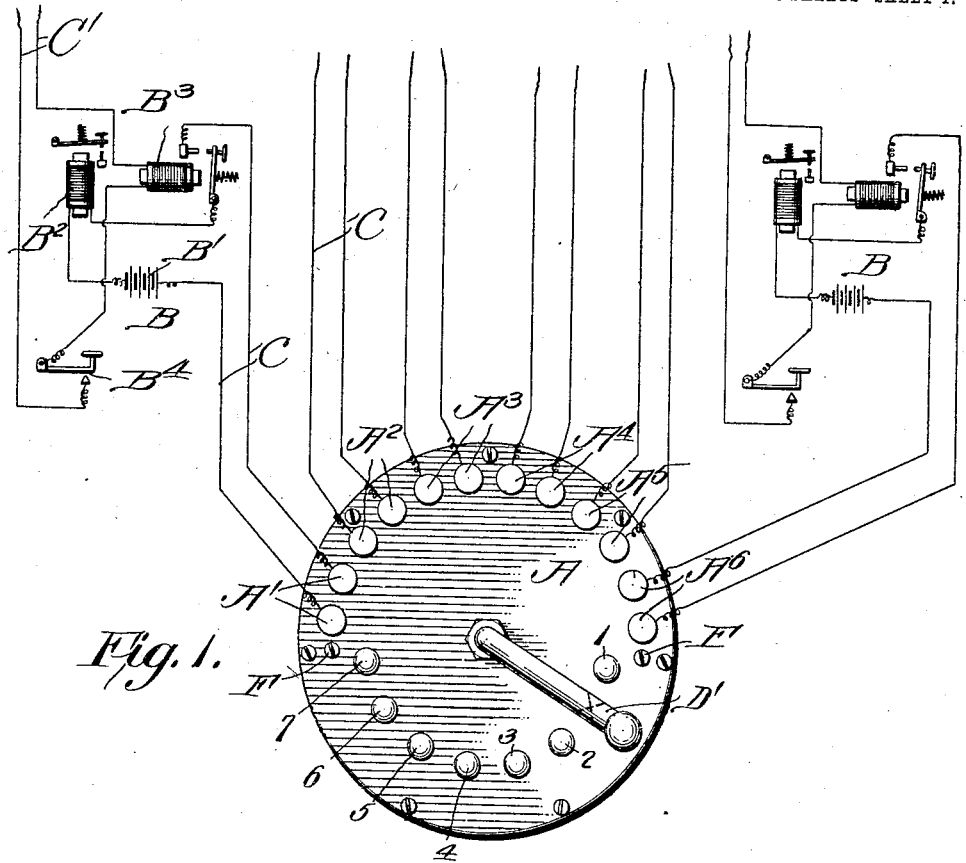
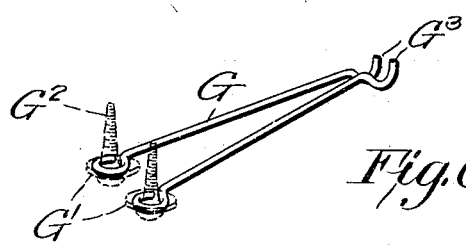
Witnesses
Oliver W. Holmes
E. B. McBath
Inventor
Albert T. Newman,
By O'Meara & Brock
Attorneys No. 879,300. PATENTED FEB. 18, 1908.
A. T. NEWMAN.
TELEGRAPH SWITCHBOARD.
APPLICATION FILED MAR. 6, 1907.

3 SHEETS—SHEET 2.

Witnesses
Oliver W. Holmes
E. B. McBath

Inventor
Albert T. Newman,
By O'Meara & Brock
Attorneys

No. 879,300. PATENTED FEB. 18, 1908.
A. T. NEWMAN.
TELEGRAPH SWITCHBOARD.
APPLICATION FILED MAR. 6, 1907.

3 SHEETS—SHEET 3.

Witnesses
Oliver W. Holmes
E. B. McBach

Inventor
Albert T. Newman
By O'Meara & Brock
Attorneys

UNITED STATES PATENT OFFICE.

ALBERT T. NEWMAN, OF GREELEY, KANSAS.

TELEGRAPH-SWITCHBOARD.

No. 879,300.

Specification of Letters Patent.

Patented Feb. 18, 1908.

Application filed March 6, 1907. Serial No. 360,886.

*To all whom it may concern:*

Be it known that I, ALBERT T. NEWMAN, a citizen of the United States, residing at Greeley, in the county of Anderson and State of Kansas, have invented a new and useful Improvement in a Telegraph-Switchboard, of which the following is a specification.

This invention relates to a switch-board adapted especially for use by telegraph operators and especially for those operators in small offices where one man will have a number of instruments to look after. The average operator in such a place will usually have at least four instruments, that is, the railroad wire the despatcher's wire, the express company wire and a commercial telegraph wire such as the Western Union. The operator is often more or less confused by the noise made by a number of sounders operating at the same time and the object of this switch-board is to give the operator perfect control over the sounders so that he can throw all of them into circuit at one time or cut all of them out, or can single out any particular sounder and cut out of its local circuit each of the other sounders.

With this object in view the invention consists of a fixed switch-board to which extend the wires of the local battery circuits in which the sounders are placed, and of a movable disk carrying various contact plates adapted to bridge gaps between the wires upon the fixed portion of the board, and to complete the local battery and sounder circuits of one or all of the instruments according to the position in to which the disk is rotated.

Figure 2:
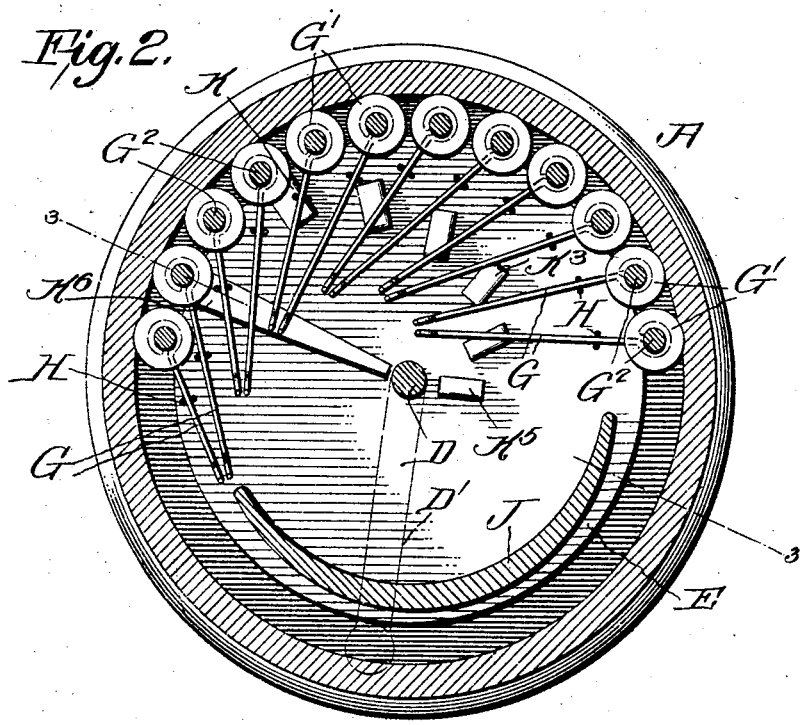
Figure 3:
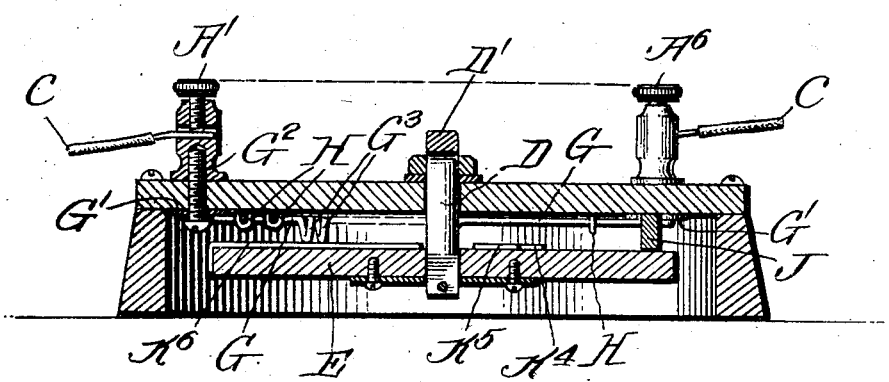
Figure 4:
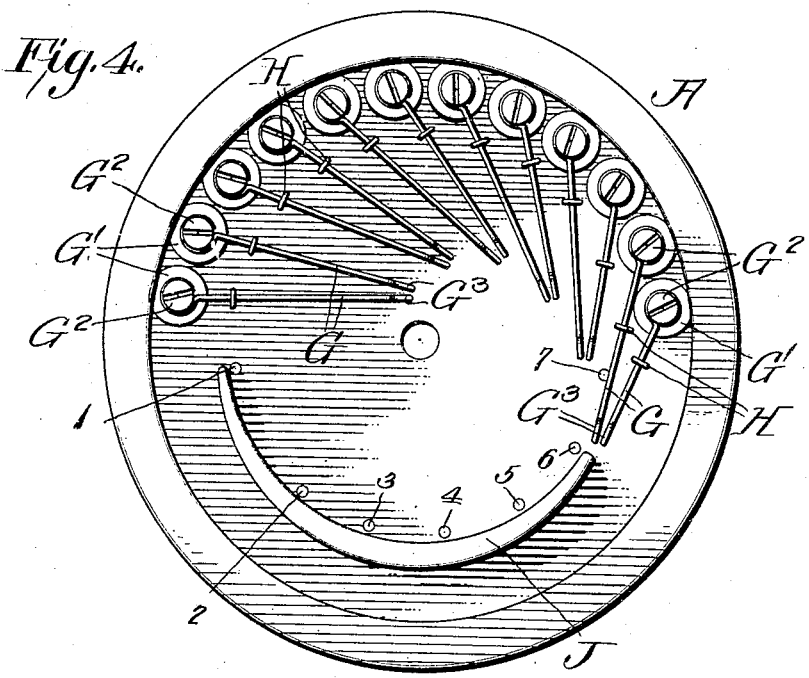
Figure 5:
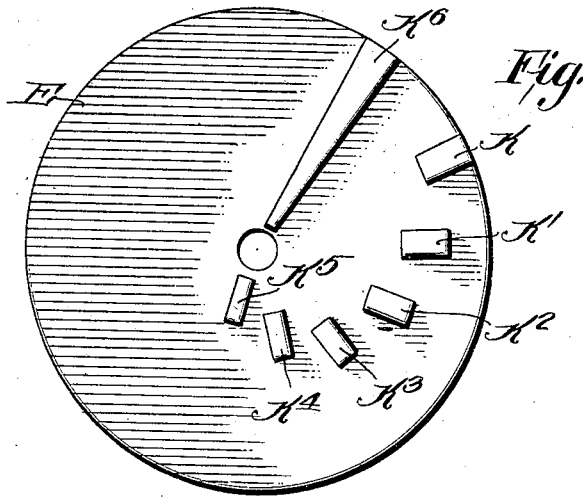

In the drawings forming a part of this specification:—Figure 1 is a side elevation showing the front of the switch-board with a diametric representation of circuits extending to this instrument, two sets of instruments being shown in a conventional manner and the others being omitted. Fig. 2 is a vertical diametric section taken through the circular switch-board. Fig. 3 is a diametric cross-section taken upon the line 3—3 of Fig. 2. Fig. 4 is an inner face view of the fixed portion of the switch-board. Fig. 5 is an inner face view of the rotatable disk and its contact plates. Fig. 6 is a detail perspective view of a pair of wire contact points removed from the switch-board, but arranged in their proper relative position to each other.

The part which I have termed a switch-board may also be properly described as a switch-box, as it is small and light enough to be conveniently carried in the hand and can be readily secured in position upon a convenient portion of the operator's desk. This board is shown as circular in form although it will be obvious that the shape and construction of the wooden parts are immaterial.

In the drawings, therefore, A represents a fixed switch-board of a non-conducting material such as wood and B represents the various groups of instruments, each group comprising a local battery B', a sounder $B^2$ and a relay $B^3$. The switch-board A carries a plurality of binding posts arranged in pairs as shown at A', $A^2$, $A^3$, $A^4$ $A^5$ and $A^6$. Each pair of posts is connected by the usual electric wires C to the respective groups of instruments, one wire of each pair extending to the battery and one wire leading to the relay contact point and the sounder is in circuit with this contact point and with the battery B'.

The telegraph key is indicated at $B^4$ and is included in the line wires C' which lead from the key and to the key through the relay $B^3$. It will be understood that the arrangement and grouping of these various instruments as well as the particular type of instruments used is entirely independent of the switch-board construction, and they are shown and described only for the purpose of making the use of the switch-board clear.

A shaft D is journaled in the center of the switch-board A and passes through to the back of the board and upon this shaft and secured or keyed thereto in any suitable manner is a disk E and to the front end of the shaft is secured a handle D'.

It will be obvious that a partial rotation of the handle will give a similar rotation to the disk E. Complete rotation of the handle would be prevented by the binding posts and in order to prevent the handle coming into contact with these posts I insert small screws F in the front face of the switch-board which screws act as stops and limit the movement of the handle, and consequently limit the extent of rotation of the disk E.

Upon the rear or inner face of the switchboard A, I secure a plurality of wires G, an end of each wire being bent to form a flat ring which ring fits between a brass washer G' and the head of a screw $G^2$, the screw extending upwardly into one of the binding posts. It will be obvious therefore that each of the wires G is electrically connected to one of the binding posts and as these binding posts are arranged in pairs the wires will also be so arranged. These wires have their free ends bent to form spring shoulders $G^3$ which shoulders project toward the inner face of the disk E. The two wires of each pair converge toward each other at their free ends but are held apart by means of staples H. The disk E rests upon the spring shoulders $G^3$ and in order to prevent that portion of the disk beneath which there are no sets of wires G from sagging or tilting I place a small segmental strip of wood J upon the back of the switch-board which forms a guide or track upon which the upper face of the disk E and contact plates carried by it may slide. Upon the disk E I secure six contact plates K, K', $K^2$, $K^3$, $K^4$, $K^5$ arranged in an irregular curve as shown in Figs. 2 and 5. I also place a radially extending contact strip $K^6$ upon the inner face of the disk E. Upon the front face of the switch-board A I place a plurality of tacks having brass heads, 1, 2, 3, 4, 5, 6 and 7 and leave a gap between the heads 1 and 2 indicated in dotted lines by the letter X.

The handle D' does not necessarily come into contact with any of these heads as it is moved from one position to the other but is simply brought into alinement with one of them according to the position which it is desired the contact plates upon the disk E to take.

The construction of the device having been explained the operation will be readily understood, and by reference to Figs. 1 and 2 it will be obvious that when the lever D' is moved into alinement with the head 1, all of the circuits of the wires C will be closed, each pair of contact wires G being connected together by a contact plate of the disk E bearing upon the shoulders $G^3$.

When the handle D' is moved over the point X all of the circuits C will be broken. As the handle is moved around to head 2, the contact strip $K^6$ will rest across the shoulders $G^3$ of the wires G which are in electrical connection with the binding posts A'. When the handle is moved to 4, the strip $K^6$ will rest across the shoulders $G^3$ of the wires G which are in electrical connection with the binding post $A^3$ and each movement of the handle from head to head will carry the strip $K^6$ to another set or pair of wires.

It will be obvious from Fig. 2 that at the same time that the wires in circuit with the binding posts $A^3$ are connected by the strip the strip is also extending across through wires, but is not in contact with the other wires, nor are the plates K, K', &c. in contact with any of the wires G when occupying the position shown in Fig. 2, for the reason that the plates or the strip contact with the wires only when they bear upon the shoulders $G^3$, and the circuits between the wires can be made only by bringing a contact plate or the strip into engagement with the shoulders of each wire of a pair.

Having thus fully described my invention, what I claim as new and desire to secure by Letters Patent, is:

1. A switch-board of the kind described comprising a fixed front portion, a plurality of binding posts carried thereby, said binding posts being arranged in the form of an arc, a shaft mounted in the switch-board, a handle secured thereto, a disk fixed to the shaft upon the rear side of the switch-board, contact wires carried by the rear face of the switch-board, and arranged in pairs corresponding to the pairs of the binding post, contact plates carried by the disk and arranged in an irregular curve upon the disk, said contact plates equaling in number the pairs of contact wires, and a radially extending contact strip also carried by the disk as and for the purpose set forth.

2. A device of the kind described comprising a switch-board having a plurality of binding posts arranged in pairs carried thereby, contact wires secured at one end to said switch-board, each wire being in circuit with one binding post, the free end portions of the wires being bent to form spring shoulders, a disk rotatably mounted adjacent said wires, a plurality of contact plates carried by the disk and adapted to simultaneously engage all of said shoulders when the disk is in one position and to be disengaged from said shoulders during all other positions of the disk, and a contact strip carried by the disk and adapted to successively engage the shoulders of each pair of wires as the disk is rotated step by step.

ALBERT T. NEWMAN.

Witnesses:
LUTE WELD,
WILLIAM H. AMBROSE.